No. 813,465. PATENTED FEB. 27, 1906.
C. W. SVENSON.
TWO SPEED HUB.
APPLICATION FILED MAY 31, 1905.

4 SHEETS—SHEET 1.

Witnesses
Chas. A. Gard
R. H. Allyn

Inventor
CHARLES W. SVENSON
By his Attorneys
Bartlett Brownell & Mitchell

No. 813,465. PATENTED FEB. 27, 1906.
C. W. SVENSON.
TWO SPEED HUB.
APPLICATION FILED MAY 31, 1905.
4 SHEETS—SHEET 2.
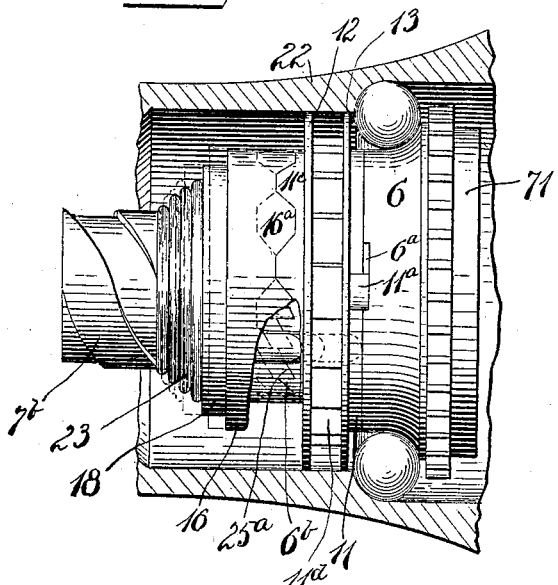
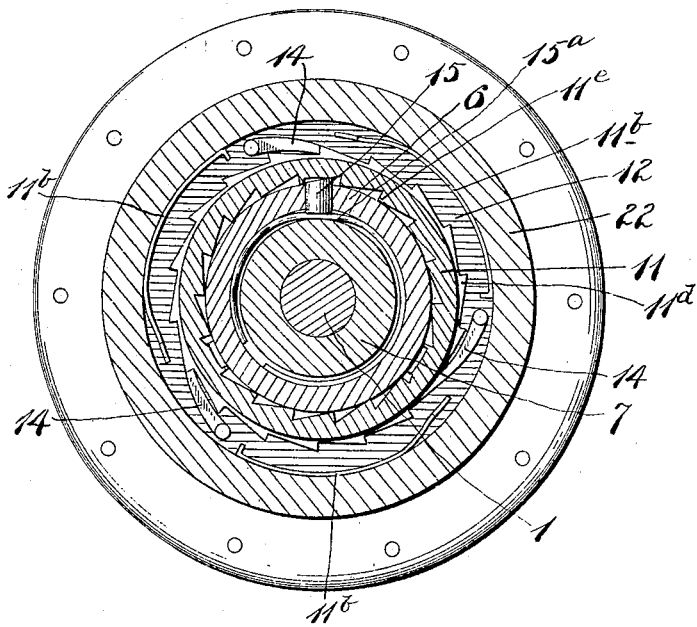
WITNESSES:
INVENTOR.
CHARLES W. SVENSON
BY
HIS ATTORNEYS.

No. 813,465. PATENTED FEB. 27, 1906.
C. W. SVENSON.
TWO SPEED HUB.
APPLICATION FILED MAY 31, 1905.

4 SHEETS—SHEET 3.

WITNESSES:
INVENTOR.
CHARLES W. SVENSON
BY
HIS ATTORNEYS

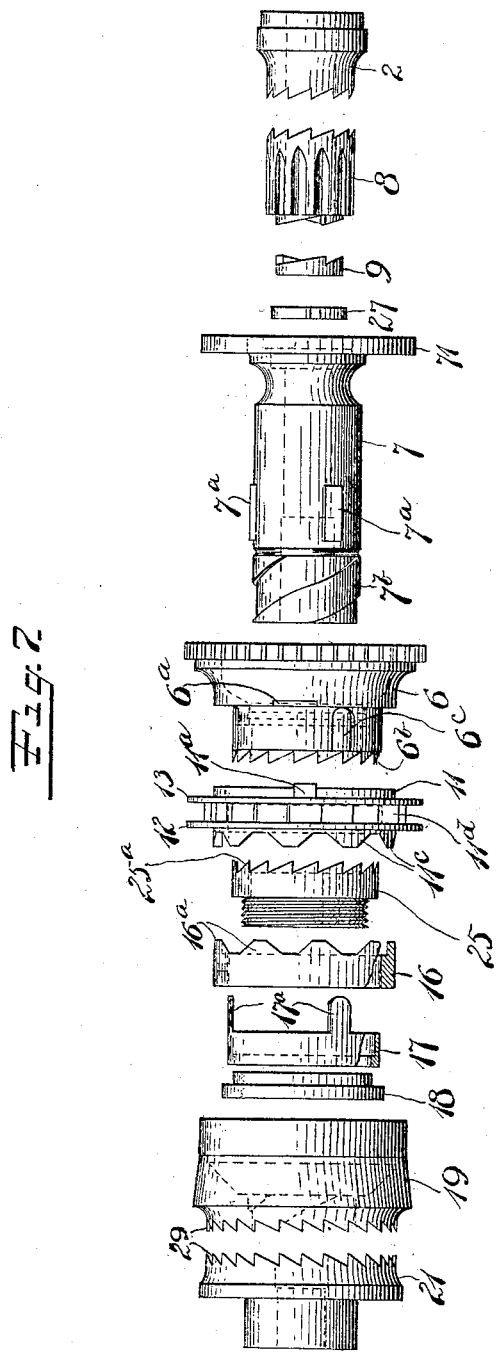

UNITED STATES PATENT OFFICE.

CHARLES W. SVENSON, OF NEW BRITAIN, CONNECTICUT, ASSIGNOR TO THE CORBIN SCREW CORPORATION, OF NEW BRITAIN, CONNECTICUT, A CORPORATION OF CONNECTICUT.

TWO-SPEED HUB.

No. 813,465.

Specification of Letters Patent.

Patented Feb. 27, 1906.

Application filed May 31, 1905. Serial No. 263,208.

*To all whom it may concern:*

Be it known that I, CHARLES W. SVENSON, a citizen of the United States, residing at New Britain, Hartford county, State of Connecticut, have invented certain new and useful Improvements in Two-Speed Hubs, of which the following is a full, clear, and exact description.

My invention relates to so-called "two-speed hubs" for bicycles and other vehicles, the construction being such that it may combine therewith a hub-brake.

By my invention power may be transmitted directly to the wheel-hub for high speed or indirectly to said hub through speed-reducing gears for low speed or hill climbing. The construction is such that when the rider stops pedaling the continued forward rotation of the hub will automatically shift the change mechanism from direct drive to gear drive, and vice versa. Ordinarily it requires a back-pedaling movement in devices of this general type to effect this change. When this is done, there is danger of applying the brake either consciously or unconsciously. By my arrangement this danger is avoided. In the present construction I employ only one clutch member for making engagement with the hub, the high and low speed mechanism transmitting their power alternately through said single clutch. Many advantages result. Heretofore in two-speed hubs two separate clutches have been employed, with attending weight, cost, and complications, which I avoid.

Figure 1:
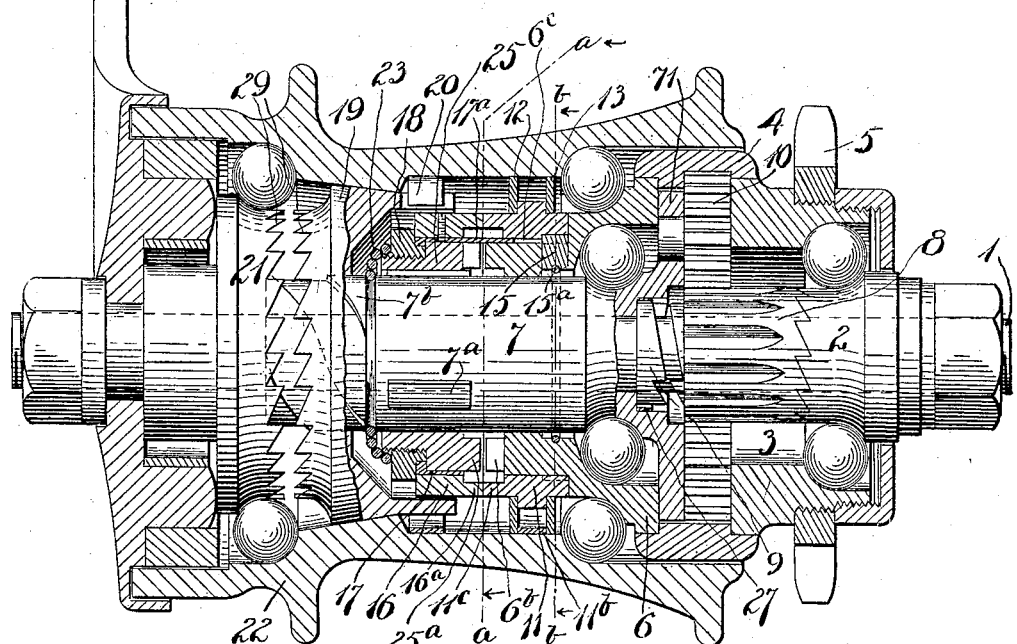
Figure 2:
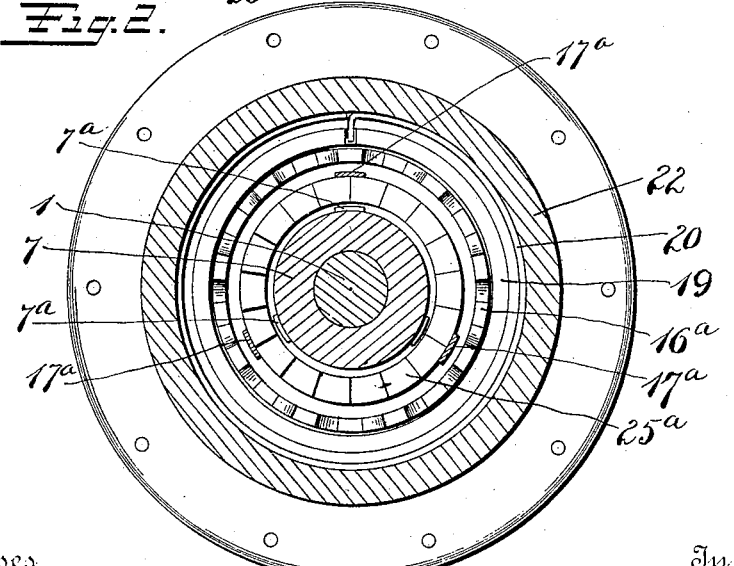
Figure 5:
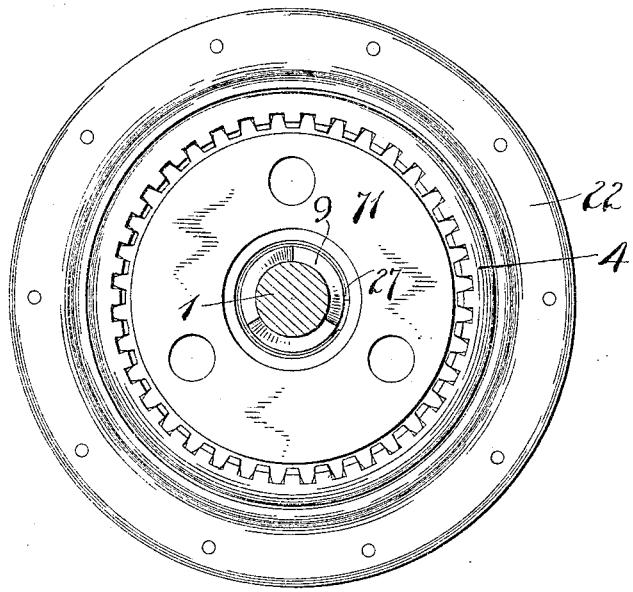
Figure 6:
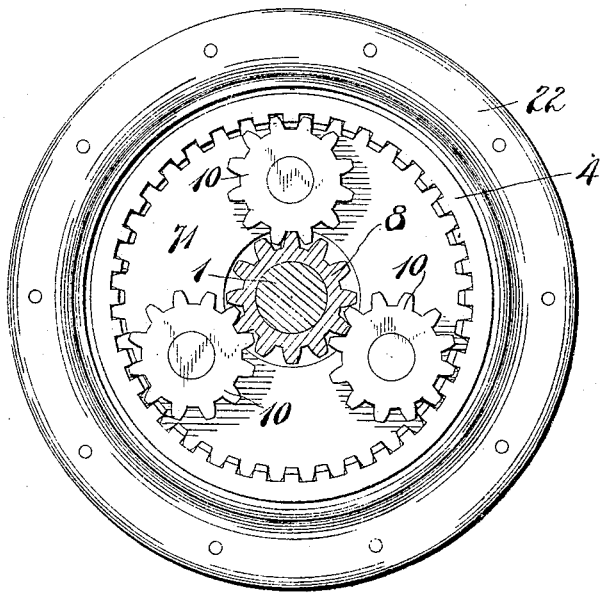

In the drawings, Figure 1 is a longitudinal section through a hub and brake of my improved construction, some of the parts being shown in elevation. Fig. 2 is a section on the line *a a*, Fig. 1, looking in the direction of the arrows. Fig. 3 is a longitudinal section of a part of the hub and certain contained parts, the latter being shown in elevation. Fig. 4 is a section on the line *b b*, Fig. 1, looking in the direction of the arrows. Fig. 5 is an end elevation of the hub, certain parts being removed and showing the planet-gear support. Fig. 6 is a similar view with the planet-gears in place, the sun-gear being shown in section. Fig. 7 is an elevation of certain details separated and on a plane somewhat reduced relatively to the other figures.

1 is the central arbor.

2 is a cone fixed on the arbor 1.

3 is a sleeve on which driving-sprocket 5 is fixed.

4 is an internal gear to which sleeve 3 is rigidly connected.

6 is what I term the "high-speed member," the same being rigidly connected with internal gear 4.

7 is what I term the "low-speed member," the same being rotatably mounted on arbor 1.

7¹ is a flange at the end of member 7, said flange affording a support for the pivots upon which "planet-gears" 10 are mounted.

8 is a "sun-gear," mounted on the arbor 1 and capable of movement thereon at certain times, as hereinafter explained. The gears 10 are always in mesh with gears 8 and 4.

9 is a shifter for sun-gear 8. This shifter is mounted on arbor 1 adjacent to the inner end of the sun-gear and is toothed to afford inclines, (see Figs. 1, 5, and 7,) while the inner end of the sun-gear is toothed to afford similar inclines. The outer end of sun-gear 8 is also toothed, while the adjacent inner end of fixed cone 2 is toothed in a similar manner. (See Figs. 1 and 7.) When sun-gear 8 stands to the right, it is locked against backward rotation by cone 2. When, however, it is shifted longitudinally in the manner hereinafter described, it will become disengaged from cone 2.

11 is what I term the "controller" of an automatic shifter. This automatic shifter is in the main similar to that shown and described in my former application, Serial No. 236,484, filed December 12, 1904, and therefore need not be described herein in detail. Suffice it to say, it is an apparatus mounted upon high-speed member 6 in such manner as that while one part 11 has a step-by-step rotary movement thereon another part has only a limited rotary movement relatively thereto, the limit of the movement being determined by a stop 11ª, standing in a short recess 6ª in the member 6.

11ᵇ is a drag-spring for controller 11, arranged to press against the inner part of the hub 22, so that should the member 6 stop rotating or lag relatively to said hub the latter will automatically shift said controller 11 from the position shown in Fig. 3 in solid lines to a position in which the stop 11ª will stand in the opposite end of the recess 6ª from that shown.

16 is what I term a "blocking-out device." The controller member 11 has flat-ended tapered teeth 11ᶜ at one end, while the blocking-out device 16 has corresponding flat-ended teeth 16ª, facing the teeth 11ᶜ. When these teeth 11ᶜ and 16ª mesh, the parts stand as shown in solid lines, Fig. 3; but when the ends of these teeth bear against one another, as shown in dotted lines, the blocking-out device 16 is held to the left, as before stated, and for the purpose to be described.

12 13 are annular frame-plates located on each side of the controller 11, and between which plates pawls 14 are hung, their functions being to engage with external teeth 11ᵈ on the member 11. (See Fig. 4.) Within the member 11 are a series of saw-teeth 11ᵉ, arranged to coact with a latch 15 on high-speed member 6. This latch 15 is normally pressed outward by a spring 15ª, so that it will engage said teeth 11ᵉ.

6ᵇ represents teeth at the inner end of the high-speed member 6. These teeth lie underneath the flat-ended teeth on the controller 11 and the blocking-out member 16 and perform the important function hereinafter described. Facing up with these teeth 6ᵇ are corresponding teeth 25ª on the end of a coupling member 25. The member 25 is splined at 7ª 7ª to the low-speed member 7 and has a sliding movement thereon. The blocking-out member 16 is fixed upon a thin annular sleeve 17, while the latter is mounted to rotate upon the coupling member 25. Sleeve 17 has projections 17ª at one end extending into ways 6ᶜ on the high-speed member 6. The sleeve 17 is held against accidental displacement on coupling member 25 by a nut 18.

19 is a driven clutch member having a tapered face arranged to engage at the proper time with the inner wall of the hub 22 to rotate the same in a forwardly direction. This clutch member 19 is mounted upon a spiral 7ᵇ on the end of low-speed member 7. It will now be seen that when the spiral 7ᵇ is rotated in a forwardly direction the clutch 19 will be drawn into engagement with the hub 22. Should, however, the advance of the hub exceed the advance of the spiral, the clutch member 19 will be shifted to the left, freeing the hub.

20 is a drag-spring on the clutch 19, said spring pressing outwardly against the hub, the purpose being to provide a slight drag, so that when the spiral 7ᵇ is turned it will take hold of the clutch and draw it into engagement with the hub, and vice versa.

21 is the operating member of a suitable hub-brake device. I need not describe the brake further than to say that it is by the backward rotation of the member 21 relatively to the supporting-arbor 1 by which the brake is actuated.

29 29 are teeth on adjacent ends of the members 19 21. When the rider back-pedals, a rearward motion will be transmitted to the spiral 7ᵇ, whereupon the clutch member 19 will move to the left, so that the aforesaid teeth 29 29 will engage. Continued rearward movement of the spiral 7ᵇ will produce the aforesaid backward rotation of the brake-operating device 21, whereupon the brake will be applied.

A brake suitable for operation by the member 21 is shown in United States Letters Patent No. 709,479, of September 23, 1902.

23 is a spring which may be held in a groove in the low-speed member 7 adjacent to the spiral 7ᵇ. This spring normally presses the coupling member 25 to the right, tending to force it in that direction, so that when the controller 11 is in the proper position the flat-ended teeth 11ᶜ and 16ª will mesh, as shown in Fig. 3.

27 is a drag-spring on the shifter 9, the same pressing outwardly against the surrounding wall of the shifter-containing recess in the end of the low-speed member 7.

The hub is mounted upon two sets of antifriction-balls, one set being arranged between the inner wall of the hub near one end and a suitable ball-race formed on the brake-operating member 21. The opposite end of the hub is supported directly by antifriction-balls arranged between it and the runway formed on the outer surface of the high-speed member 6. The high-speed member 6 is supported on antifriction-balls arranged between it and the runway on the low-speed member 7. Sleeve 3 is supported on balls arranged between it and cone 2. By this arrangement it will be seen that all the parts move easily and freely.

Operation: When the parts are in the position shown in Fig. 1, (in which position the blocking-out member 16 stands away from the controller 11, so that the flat ends of the teeth 16ª and 11ᶜ bear end to end,) power will be transmitted from the sprocket 5 to the hub through the planetary gears 10. The course which the power takes is as follows: from sprocket 5 through sleeve 3 to internal gear 4, thence to the planet-gears 10, flange 7¹, low-speed member 7, spiral 7ᵇ, and clutch 19 to the hub. It will be observed that during this operation the coupling member 25 is uncoupled from the high-speed member 6. The consequence is the high-speed member 6 and the low-speed member 7 will revolve at different speeds. The high-speed member 6 will be revolved at the speed corresponding to the speed of the sprocket; yet the power will be transmitted through the planetary gears, as before stated. The projections 17ª, projecting into the ways 6ᶜ, cause the blocking-out member 16 to revolve at the same speed as the high-speed member 6, this being permitted by the rotatable connection between the thin sleeve 17 and the support 25. The instant the rider stops pedaling the mechanism automatically shifts. This is effected as follows: When the hub 22 moves at a speed greater than the high-speed member, it shifts the controller one step or one tooth, said shifting being effected through the medium of the drag-springs 11ᵇ. This shifting of the controller one tooth causes the teeth 11ᶜ to stand between the teeth 16ª 16ª, and when this occurs the spring 23 pushes the coupling member 25 to the right upon the splines 7ª until the flat-ended teeth 11ᶜ and 16ª mesh, at which time the end teeth 6ᵇ on the high-speed member will mesh with the end teeth 25ª on the coupling member. Now the instant that power is applied to the sprocket 5 it will be transmitted, through sleeve 3, gear 4, and high-speed member 6, to the coupling member 25 and thence through the member 7 by means of the splines 7ª to the spiral 7ᵇ and then, as before, through the same hub-clutch 19 to the hub. Of course it is apparent that during this movement it is necessary that the sun-gear 8 should rotate freely with the other parts. Hence at the outset it will be seen that the sun-gear will be rotated in a direction to free the teeth at the adjacent ends of the cone 2 and sun-gear 8, while at the same time the teeth at the opposite end of the sun-gear ride down the inclines on the shifting member 9. While the power is being transmitted at high speed, all the parts are practically coupled together, so that they will rotate at the same speed. When the rider again stops pedaling and the hub 22 overruns the driving parts, the controller 11 is again shifted one step, and the parts automatically resume the position originally described, in which the power will be transmitted at a relatively reduced speed through the planet-gears 10. The sun-gear 8 moves back to its position shown in solid lines, Fig. 1, by reason of the backing impulse of the planet-gears 10 10, which will cause said sun-gear to ride up the inclines on the shifting device 9, moving the sun-gear to the right, so that its teeth will mesh with the teeth on the fixed cone 2, by which the further backward movement of the sun-gear is checked.

What I claim is—

1. In a two-speed hub mechanism, a hub, a clutch, a driving member, and means intermediate of said clutch and said driving member for coupling said parts so that they will turn in one direction at the same speed, said means transmitting power from said driving member to said clutch, and other means between the same clutch and said driving member whereby they will turn in one direction at different speeds, said means conveying power from the driving member to said clutch and means operated by a change in the relative speed of the driver and hub for effecting the change from the high-speed drive to the low-speed drive, and vice versa.

2. In a two-speed hub mechanism, a hub, a clutch, a driving member, and means intermediate of said clutch and said driving member for coupling said parts so that they will turn in one direction at the same speed, and other means between the same clutch and said driving member whereby they will turn in one direction at different speeds and means operated by a change in the relative speed of the driver and hub for effecting the change from the high-speed drive to the low-speed drive, and vice versa.

3. In a two-speed hub mechanism, a hub, a clutch, a driving member, and means intermediate of said clutch and said driving member for coupling said parts so that they will turn in one direction at the same speed, said means transmitting power from said driving member to said clutch, and other means between the same clutch and said driving member whereby they will turn in one direction at different speeds, said means conveying power from the driving member to said clutch, and means for automatically effecting the change from relatively high speed to relatively low speed between the driver and said clutch.

4. In a two-speed hub mechanism, a hub, a clutch, a driving member, and means intermediate of said clutch and said driving member for coupling said parts so that they will turn in one direction at the same speed, and other means between the same clutch and said driving member whereby they will turn in one direction at different speeds, and means for automatically effecting the change from relatively high speed to relatively low speed between the driver and said clutch.

5. In a device of the character described, a driver, a clutch, a hub, said clutch adapted to engage said hub, a spiral support for said clutch, and means intermediate said driver and said spiral for transmitting power and rotary motion at two relatively different speeds and a controller located within the hub and operable by the hub to shift the driving connection from high speed to low speed, and vice versa.

6. In a device of the character described, a driver, a clutch, a hub, said clutch adapted to engage said hub, a spiral support for said clutch, and means intermediate said driver and said spiral for transmitting power and rotary motion at two relatively different speeds, including a low-speed member and a high-speed member, a coupling for the latter and means to automatically interlock and free said coupling alternately with said high-speed member or said low-speed member.

7. In a device of the character described, a hub, a driver or sprocket, a high-speed member, a low-speed member, a clutch coöperating with both of said members alternately, a coupling device for one of said members, and means for automatically coupling and uncoupling said high-speed member with said clutch.

8. In a device of the character described, a hub, a driver or sprocket, a high-speed member, a low-speed member, a clutch coöperating with both of said members alternately, a coupling device for one of said members, and means for automatically coupling and uncoupling said high-speed member with said clutch through the medium of said low-speed member.

9. In a device of the character described, a hub, a driving member or sprocket, a high-speed member directly connected to said sprocket, a low-speed member concentric with the former, intermediate gear connections between said low-speed member and said sprocket, a clutch, said low-speed member being operatively connected therewith at all times, and means for automatically and alternately engaging and disengaging said high-speed member with said clutch.

10. In a device of the character described, a hub, a clutch, a spiral support for said clutch, a low-speed member operatively connected to said spiral at all times, planet-gears carried thereby, a sun-gear in mesh with said planetary gears, means to permit the sun-gear to turn freely in one direction and to hold it against rotation in an opposite direction, a high-speed member, a coupling device between said high-speed member and said clutch and means for engaging and disengaging said coupling member from said high-speed member.

11. In a device of the character described, a hub, a clutch, a high-speed member, a low-speed member, a driver directly connected with the former and indirectly with the latter, and a coupling device for one of said members between it and the clutch, and means for alternately and automatically engaging and disengaging said coupling member.

12. In a device of the character described, a hub, a driver, means for transmitting power from said driver to said hub at two different ratios, said means including a sun and planetary gear, said sun-gear being free to revolve when power is being transmitted through the high-speed member, and means to automatically check the rotation of said sun-gear when power is being transmitted through said planetary gears.

13. In a device of the character described, a hub, a clutch, a single driver, means for transmitting power at relatively different ratios from said single driver to said hub, a coupling device, a blocking-out member, controlling means for automatically and alternately engaging with, and disengaging said coupling from, the source of power.

14. In a device of the character described, a single clutch for transmitting power at two relatively different speeds from the driving to the driven member, an automatic controlling device for said clutch comprising a controller having a step-by-step rotary action, and a controller-actuator having a limited oscillating action.

CHARLES W. SVENSON.

Witnesses:
WM. V. COLLINS,
L. M. BRAMAN.